US012614438B2

(12) United States Patent
Thomas et al.

(10) Patent No.: US 12,614,438 B2
(45) Date of Patent: Apr. 28, 2026

(54) LIGATURE DETECTION

(71) Applicant: SAFEHINGE LIMITED, Glasgow (GB)

(72) Inventors: Gus Thomas, Glasgow (GB); Martin Izod, Glasgow (GB)

(73) Assignee: Safehinge Primera Limited, Glasgow (GB)

( * ) Notice: Subject to any disclaimer, the term of this patent is extended or adjusted under 35 U.S.C. 154(b) by 100 days.

(21) Appl. No.: 18/685,788

(22) PCT Filed: Aug. 22, 2022

(86) PCT No.: PCT/GB2022/052168
§ 371 (c)(1),
(2) Date: Feb. 22, 2024

(87) PCT Pub. No.: WO2023/026036
PCT Pub. Date: Mar. 2, 2023

(65) Prior Publication Data

US 2024/0355186 A1 Oct. 24, 2024

(30) Foreign Application Priority Data

Aug. 23, 2021 (GB) ..................................... 2112046

(51) Int. Cl.
*G08B 21/02* (2006.01)
*E06B 7/28* (2006.01)
(Continued)

(52) U.S. Cl.
CPC ................ *G08B 21/02* (2013.01); *E06B 7/28* (2013.01); *G08B 21/182* (2013.01); *E05D 7/081* (2013.01)

(58) Field of Classification Search
CPC ......... G08B 21/02; G08B 21/182; E06B 7/28; E05D 7/081
(Continued)

(56) References Cited

U.S. PATENT DOCUMENTS 7,999,690 B1 * 8/2011 Shilts ...................... E05D 11/00 340/666
8,803,689 B2 * 8/2014 Berger .................. E05B 63/248 292/144
(Continued)

FOREIGN PATENT DOCUMENTS

WO WO-2019220089 A1 * 11/2019 ............. G08B 21/02

*Primary Examiner* — Zhen Y Wu
(74) *Attorney, Agent, or Firm* — Dickinson Wright PLLC

(57) ABSTRACT

There is provided a controller, a system, computer software and a method for detecting a ligature on a door mounted within a door frame on mounting means. A load applied by the door to the mounting means is detected by a load sensor. An angle of the door relative to the door frame is detected by an angle sensor. Baseline load data is obtained, the baseline load data being indicative of an expected load applied by the door to the mounting means as a function of the angle of the door. The method comprises determining a threshold load value indicative of a ligature on the door for the measured angle in dependence on the baseline load data and the detected angle of the door; determining whether the detected load exceeds the threshold load value for the detected angle; and outputting an indication of a detected ligature event if the detected load exceeds the threshold load value.

25 Claims, 13 Drawing Sheets

(51) Int. Cl.
*G08B 21/18* (2006.01)
*E05D 7/081* (2006.01)

(58) Field of Classification Search
USPC .......................................................... 340/665
See application file for complete search history.

(56) References Cited

U.S. PATENT DOCUMENTS

| | | | | |
|---|---|---|---|---|
| 11,136,789 | B2 * | 10/2021 | Colligan | E05B 47/026 |
| 11,417,180 | B2 * | 8/2022 | Izod | G08B 21/02 |
| 2005/0161954 | A1 * | 7/2005 | Miskin | E05F 5/02<br>292/229 |
| 2011/0068927 | A1 * | 3/2011 | Berger | E05B 63/248<br>340/573.1 |
| 2017/0260772 | A1 * | 9/2017 | Standley | E05B 1/003 |
| 2018/0347229 | A1 * | 12/2018 | Riley | E05B 1/003 |
| 2019/0266862 | A1 * | 8/2019 | Harrison | G08B 21/0461 |
| 2020/0102776 | A1 * | 4/2020 | Eshuis | E05D 7/0423 |
| 2020/0208436 | A1 * | 7/2020 | Colligan | G08B 5/36 |
| 2021/0225142 | A1 * | 7/2021 | Izod | G08B 13/08 |
| 2021/0310279 | A1 * | 10/2021 | Hall | G08B 21/043 |

* cited by examiner

A

B

A

B

LIGATURE DETECTION

CROSS-REFERENCE TO RELATED APPLICATIONS

The present application is a 35 U.S.C. Section 371 national stage filing of International Patent Application No. PCT/GB2022/052168, filed 22 Aug. 2022, and through which priority is claimed to UK Patent Application GB 2112046.4, filed 23 Aug. 2021.

This invention relates to the detection of ligature on a door. In particular the invention relates to a controller, a system, a method and to computer software for ligature detection.

BACKGROUND

There are a number of institutions within which there is a risk that patients or inmates of those institutions may seek to end their lives. One example of such an institution is in mental health institutions. One common way that patients may seek to end their own life is to make a ligature on a door from which the patient can attempt to hang or suffocate themselves through anchor based suspension to restrict oxygen reaching the brain. Such ligatures can be formed by anything upon which a cord can be tied around, trapped within or at any point where two hard surfaces meet (a so-called "ligature point"). For example, ligature points may be formed between the top of the door and the door frame, the latch of the door and the door frame, the hinges of the door and the door frame, or the threshold or bottom of the door and the floor. A ligature may also be formed by trapping hardware within a door to form a ligature point, or by looping a cord around any part of the door.

Accordingly, it is of paramount importance that staff and healthcare providers in such institutions have systems in place that will alert them to an attempted ligature so that they are able to prevent fatalities.

One solution is to provide an alarm on the top of the door of the room of a patient that is considered to be at risk. Typical alarms are located at the top of the door and consist of a switch along the top of the door. When a ligature is placed over the door and weight is applied the contacts close and the alarm is activated. Unfortunately, such systems are only able to detect ligatures located where there is a switch via direct sensing and are unable to detect ligatures at any other point around the door. Furthermore, these systems are limited in their sensing ability in that the switch is a binary input that triggers due to a specific load (i.e. not dynamically adjustable) in only one direction.

In WO/2019/220089, a door ligature alarm is provided for a door mounted within a door frame on mounting means. The door has movement sensing means for determining whether the door is moving relative to the door frame, and load sensing means for determining the load applied by the door to the mounting means. By detecting an abnormal load by the load sensing means, a ligature can be detected at any point around the door. However, moving the door causes a great variance in the apparent weight of the door and not a consistent baseline reading. To address this, when the door is detected to be stationary by the movement sensing means, the load readings from the load sensing means are averaged to produce a calibrated threshold value. The door may then be recalibrated following each movement to determine an accurate baseline from which an abnormal load can be detected.

However, if a ligature is applied whilst the door is in motion, the subsequent recalibration may cause the ligature to go undetected. Practically, if a door is open then the door is frequently subject to movement, and so the application of a ligature to an open door may cause the door to swing. Thus, a ligature may only be reliably detected if a door is closed.

Accordingly, at least some aspects of the present invention are directed at providing improved ligature detection and thus an improved door alarm.

BRIEF SUMMARY OF THE DISCLOSURE

In accordance with the present inventions there is provided a controller, a system, a computer-implemented method and computer software or detecting a ligature on a door.

According to a first aspect there is provided a controller for detecting a ligature on a door mounted within a door frame on mounting means, comprising: a communication module configured to receive, from a load sensor, load sensing data indicative of a detected load applied by the door to the mounting means, and receive, from an angle sensor, angle data indicative of a measured angle of the door relative to the door frame; one or more processors; and a memory storing computer executable instructions therein which, when executed by the one or more processors, cause the one or more processors to: obtain baseline load data indicative of an expected load applied by the door to the mounting means as a function of the angle of the door; determine a threshold load value indicative of a ligature on the door for the measured angle in dependence on the baseline load data and the angle data; determine whether the load indicated by the load sensing data exceeds the threshold load value for the measured angle; and output an indication of a detected ligature event if the load exceeds the threshold load value.

The baseline load data may directly comprise the expected load or may comprise data from which the expected load may be derived. Optionally, the baseline load data is indicative of an expected load applied by the door to the mounting means at each angle within a range of motion of the door. For example, the baseline load data may be represented as a baseline load function or curve defining a relationship between expected load and door angle. In some embodiments, the baseline load function may also define the expected load to be a function of other parameters such as a door speed (rate of change of door angle) or door acceleration (rate of change of door speed).

Optionally, the baseline load data is dependent on a direction of motion of the door. The baseline load data may comprise: positive baseline load data indicative of the expected load as a function of the angle of the door when the door is moving in a first direction; negative baseline load data indicative of the expected load as a function of the angle of the door when the door is moving in a second direction; and static baseline load data indicative of the expected load as a function of the angle of the door when the door is static.

The one or more processors may be configured to obtain the baseline load data by: receiving training data indicative of measurements taken by the load sensor in the absence of a ligature, the training data comprising a set of load values each having an associated door angle across a range of door angles; dividing the range of door angles into a plurality of angle bins each defining a sub-range of door angles, each angle bin being associated with a plurality of the load values; and averaging the plurality of load values for each angle bin to determine the expected load for the angle bin. The baseline load data may be determined by interpolating the expected load between each angle bin to provide a baseline load function, the baseline load function defining an expected load at each door angle within a range of motion of the door. Optionally, the range of door angles of the training data extends over a full range of motion of the door relative to the door frame in use. Each angle bin may define a sub-range of between 1° and 3° or 0.5° to 4° or 1° to 4°. For example, each angle bin may define a sub-range of 1°, 2°, or 3°.

Optionally, the communication module is configured to receive updated training data, and the one or more processors are configured to update the baseline load data in dependence on the updated training data.

The one or more processors may be configured to: create a live baseline based on a weighted rolling average of the received load sensing data at each angle; and update the baseline load data in dependence on the live baseline. The rolling average may be weighted to provide less weight to older received load sensing data.

Optionally, the one or more processors are configured to determine the threshold value as a predetermined offset from the expected load value corresponding to the measured angle of the door.

Optionally, the one or more processors are configured to: determine a positive threshold value greater than the expected load value and a negative threshold value less than the expected load value, and determine the load indicated by the load sensing data exceeds the threshold value if the load is greater than the positive threshold value or is less than the negative threshold value.

Optionally, the communication module is configured to continue to receive the angle data from the angle sensor, and the one or more processors are configured to update the threshold value when the measured angle of the door changes.

Optionally, the communication module is configured to continue to receive the load sensing data from the load sensor, and the one or more processors are configured to continually determine whether the load indicated by the load sensing data exceeds the threshold value. The indication may be output if the load applied by the door continues to exceed the threshold value for at least a specified period.

In some embodiments, the communication module is configured to transmit an alarm signal to an external alarm system to activate the external alarm in response to the indication of a detected ligature event being output by the one or more processors. The transmittal may be performed via a wired or a wireless connection to the external alarm system.

According to another aspect there is provided a system for detecting a ligature on a door, comprising: a controller according to the aspect above, mounting means configured to mount the door within a door frame; an angle sensor configured to detect an angle of the door with respect to the door frame and transmit angle data indicative of the angle of the door to the controller; and at least one load sensor configured to determine the load applied to the mounting means by the door and transmit load sensing data indicative of the load to the controller. The at least one load sensor may comprise a strain gauge. The angle sensor may comprise a magnet and magnetic angle detector. The system may further comprise a door mounted within a door frame by the mounting means, wherein the controller, angle sensor and at least one load sensor are integrated with the door.

According to another aspect there is provided a computer-implemented method for detecting a ligature on a door mounted within a door frame on mounting means, comprising: detecting, at a load sensor, a load applied by the door to the mounting means; detecting, at an angle sensor, an angle of the door relative to the door frame; obtaining baseline load data indicative of an expected load applied by the door to the mounting means as a function of the angle of the door; determining a threshold load value indicative of a ligature on the door for the measured angle in dependence on the baseline load data and the detected angle of the door; determining whether the detected load exceeds the threshold load value for the detected angle; and outputting an indication of a detected ligature event if the detected load exceeds the threshold load value. The baseline load data may be indicative of an expected load applied by the door to the mounting means at each angle within a range of motion of the door. For example, the baseline load data may be represented as a baseline load function or curve defining a relationship between expected load and door angle. In some embodiments, the baseline load function may also define the expected load to be a function of other parameters such as a door speed (rate of change of door angle) or door acceleration (rate of change of door speed). The baseline load data may be dependent on a direction of motion of the door.

Optionally, obtaining the baseline load data comprises in a training phase: taking, at the load sensor, measurements of the load applied to the door in the absence of a ligature across a range of door angles, the measurements comprising a set of load values each having an associated door angle; dividing the range of door angles into a plurality of angle bins each defining a sub-range of door angles, each angle bin being associated with a plurality of the load values; and averaging the plurality of load values for each angle bin to determine the expected load for the angle bin. Obtaining the baseline load data may comprise interpolating the expected load between each angle bin to provide a baseline load function, the baseline load function defining an expected load at each door angle within a range of motion of the door. The range of door angles of the training data may extend over a full range of motion of the door relative to the door frame in use. Each angle bin may define a sub-range of between 1° and 3°. The training phase may be performed periodically or continuously.

The method may comprise continually detecting the angle of the door by the angle sensor and updating the threshold value when the measured angle of the door changes.

The method may comprise continually detecting, by the load sensor, the load applied by the door to the mounting means, determining whether the detected load continues to exceed the threshold value, and outputting the indication if the load applied by the door continues to exceed the threshold value for at least a specified period. "Continues to exceed" the threshold value may not mean remains above the threshold continually, but rather may mean that the load spends at least a predetermined portion of the specified period above the threshold. For example, the specified period may be 2 s, 3 s or 4 s. The predetermined portion may be e.g. 80%. Thus, if the detected load exceeds the threshold for at least 80% of the specified period, it may be determined that the door exceeds threshold value for at least a specified period. In this way, loads which hover around the threshold but do not continuously exceed due to sensor fluctuations can be captured.

Outputting the indication of a detected ligature event may comprise transmitting an alarm signal to an external alarm system to activate the external alarm.

According to another aspect there is provided computer software which, when executed, is arranged to perform a method according to the above aspect.

BRIEF DESCRIPTION OF THE DRAWINGS

Embodiments of the invention are further described hereinafter with reference to the accompanying drawings, in which.

DETAILED DESCRIPTION

Figure 1:
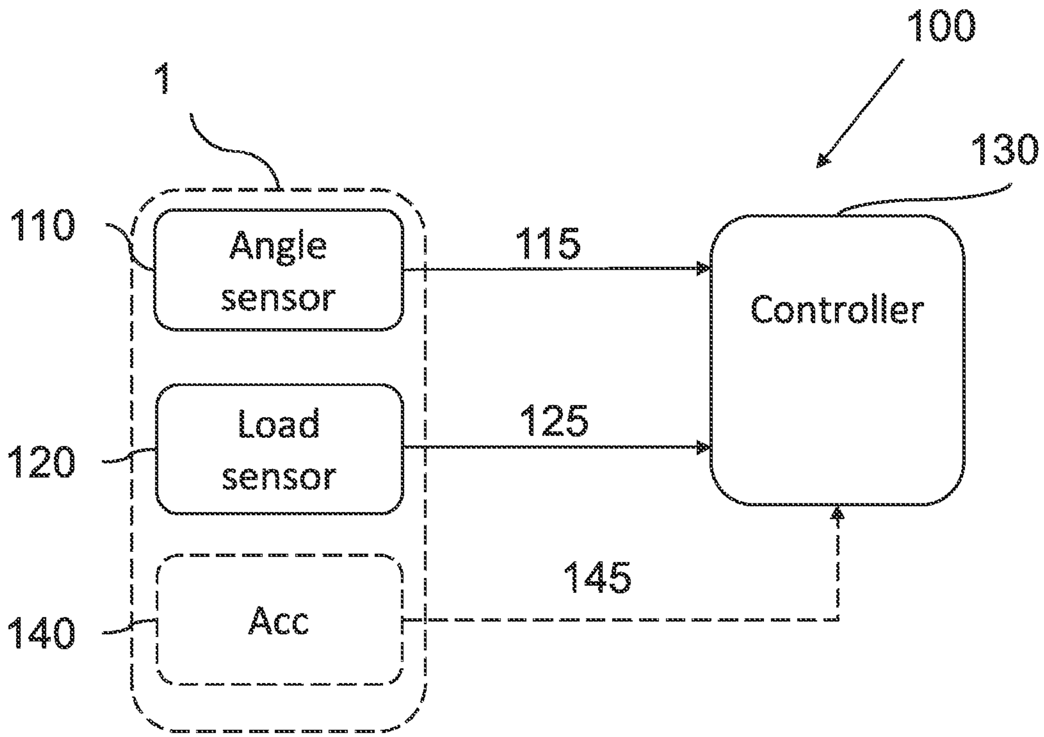
FIG. 1 is a schematic of a system 100 according to an embodiment of the invention.

With reference to FIG. 1, there is shown a schematic of a system 100 for detecting a ligature on a door according to an embodiment of the present invention.

The system 100 comprises an angle sensor 110, a load sensor 120 and a controller 130. The angle sensor 110 and the load sensor 120 are each associated with a door (not shown) which is mounted, via mounting means such as a hinge, on a door frame. The angle sensor 110 is configured to detect an angle of the door with respect to the door frame. The load sensor 120 is disposed on the mounting means and configured to measure the load applied by the door to the mounting means. Each of the angle sensor 110 and the load sensor 120 are communicatively coupled to a controller 130. The angle sensor 110 and the load sensor 120 may be connected to the controller 130 via a wired connection or may be coupled wirelessly. For example, a wireless connection may be provided via a short-range communication protocol such Bluetooth, NFC, Wi-Fi or the like. In some embodiments, the angle sensor 110 and the load sensor 120 may be connected to the controller 130 indirectly via one or more networks such as a local area network (LAN) or the Internet. The angle sensor 110 is configured to transmit angle data 115 to the controller 130, the angle data 115 comprising a measured angle of the door relative to the door frame. The load sensor 120 is configured to transmit load sensing data 125 to the controller 130, the load sensing data 125 comprising a detected load applied by the door to the mounting means as measured by the load sensor 120. The angle sensor 110 and the load sensor 120 are each configured to continuously or periodically transmit the angle data 115 and the load sensing data 125 to the controller 130, such that the controller 130 is provided with a time series of angle and load measurements.

In some embodiments, the system 100 may optionally also include an accelerometer 140. In such embodiments, the accelerometer 140 is arranged to measure an acceleration of the door with respect to the door frame and transmit measured acceleration data 145 to the controller 130. This acceleration data 145 may be utilised by the controller 130 to identify periods in which the door is idle in order to save power within the system 100, as will be explained.

Figure 2:
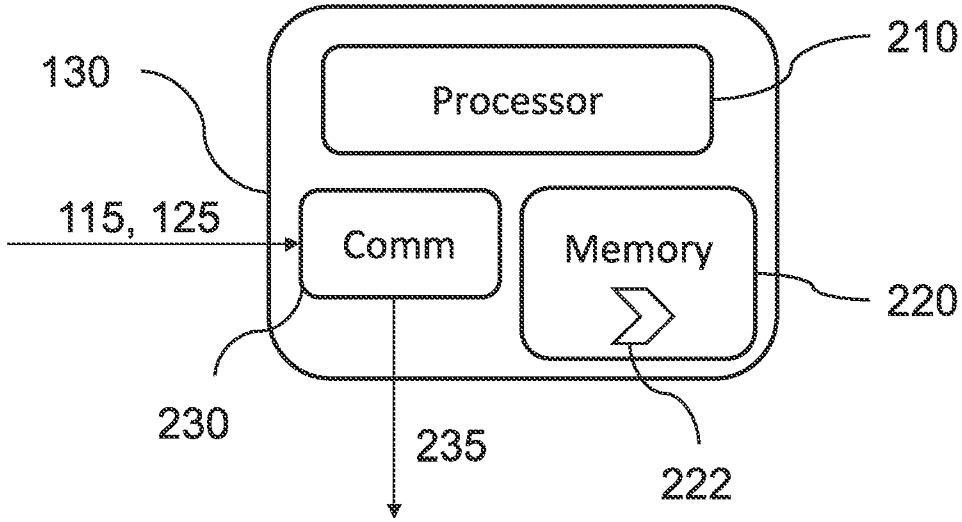
FIG. 2 is a block diagram of a controller 130 according to an embodiment of the invention.
Figure 3:
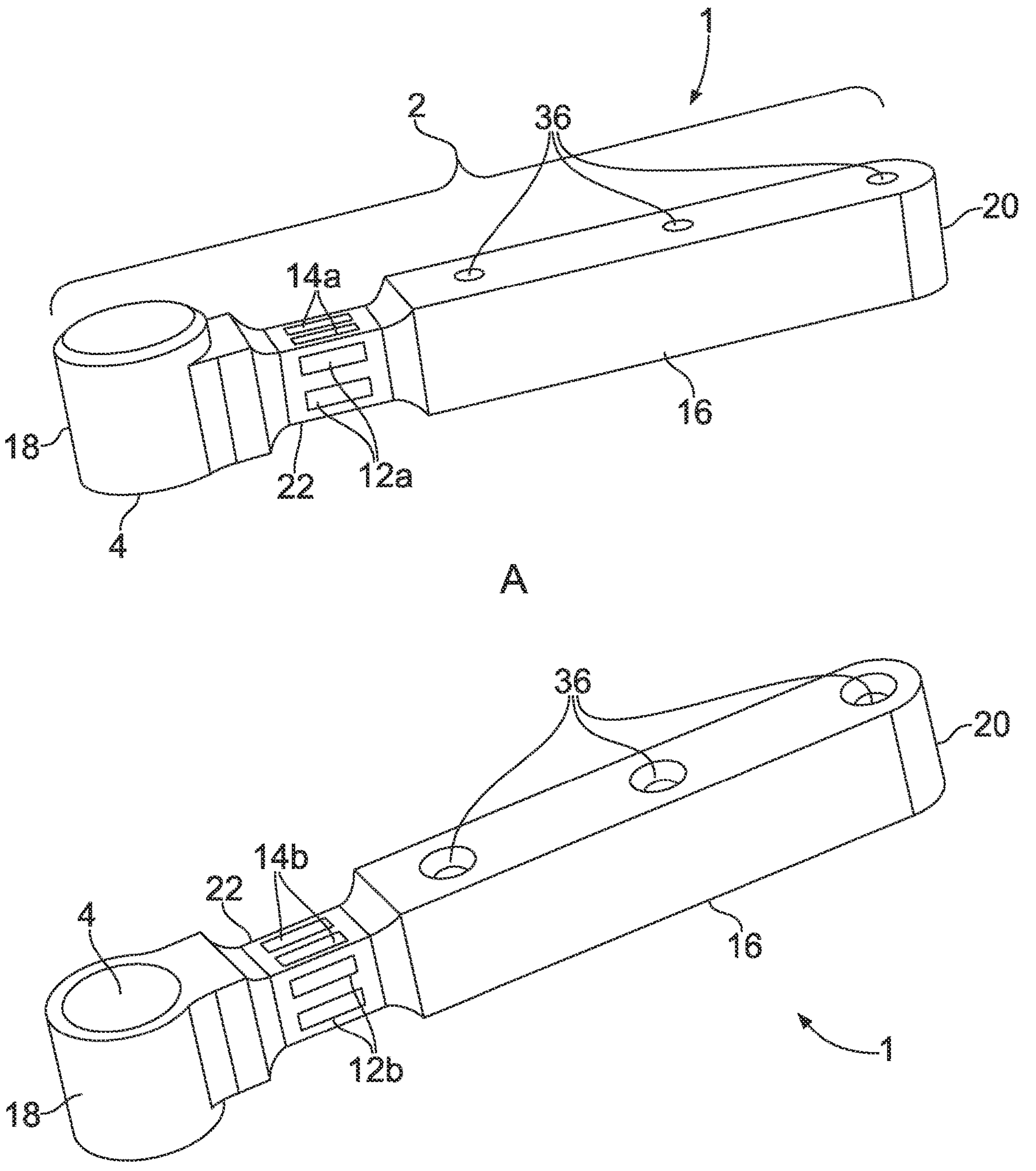
FIG. 3 shows a side perspective view of an example load measuring apparatus 1 from (A) above and (B) below.
Figure 4:
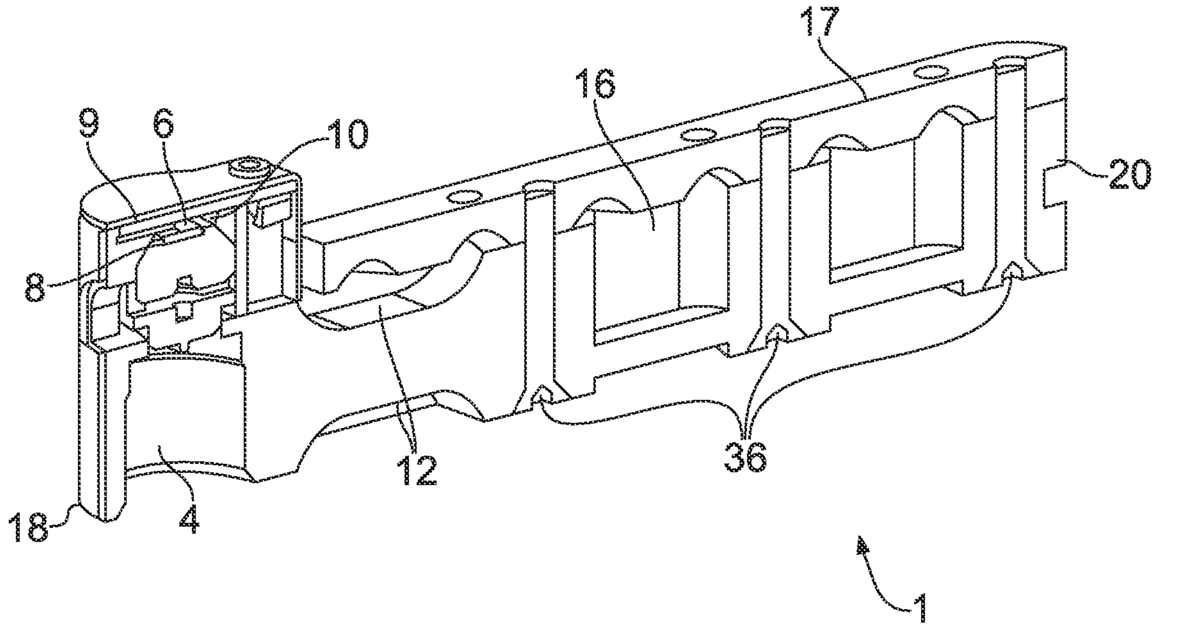
FIG. 4 shows a cross-sectional view of the load measuring apparatus 1.

Referring to FIG. 2, there is shown a block diagram of the controller 130. The controller 130 comprises a memory device 220, a processor 210 and a communication module 230. The controller 130 is adapted to receive, through the communication module 230, the angle data 115 and the load sensing data 125 from the angle sensor 110 and the load sensor 120. In embodiments including an accelerometer 140, the controller 130 is also arranged to receive the acceleration data 145 through the communication module 230. The memory 220 is configured to store computer-readable instructions 222 which when executed, cause the processor 210 to perform methods according to the present invention. The controller 130 is configured to determine whether a ligature is detected on the door in dependence on the angle data 115 and the load data 125, as will be explained.

Figure 7:
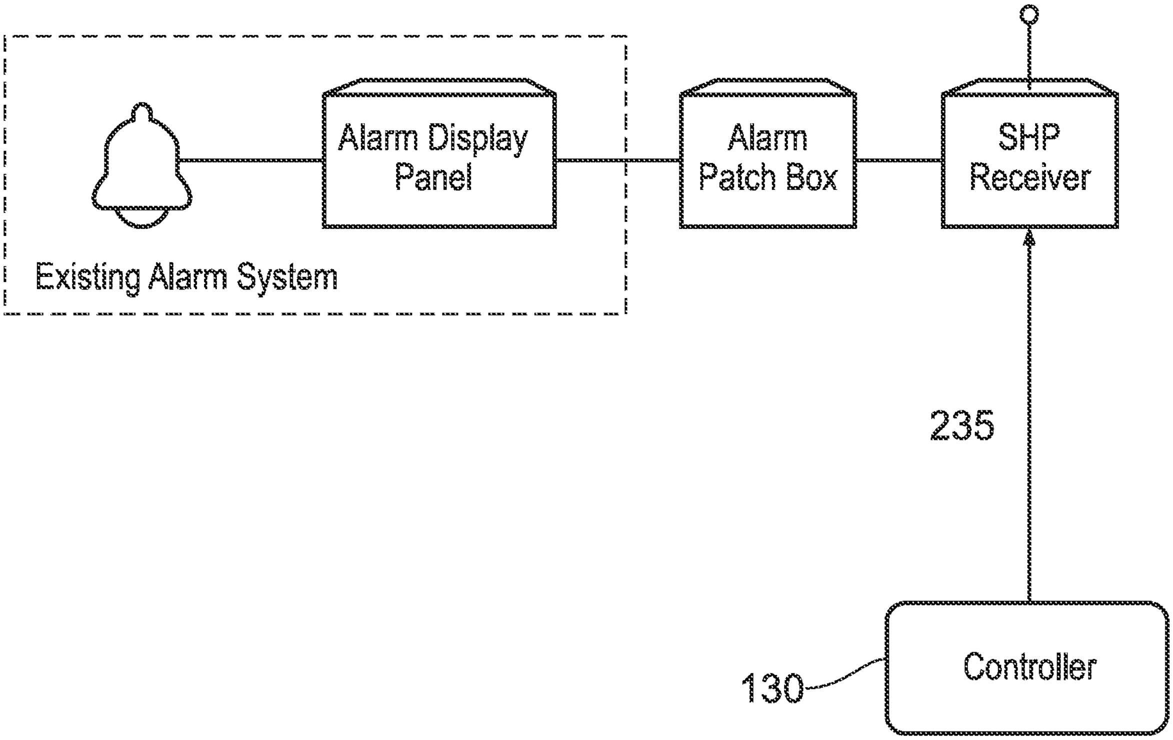
FIG. 7 shows a schematic illustration of an alarm system.

If it is determined that a ligature is detected, the controller may be configured to transmit, via the communication module 230, an alarm signal 235 to an external alarm system to activate the external alarm and alert a healthcare provider or another relevant person or service to an attempted ligature at the door. Thus, when a ligature is detected the controller 130 may trigger an external alarm system, such as the system shown schematically in FIG. 7. The alarm signal 235 may include an identification tag associated with the system 100 to ensure that it is clear the identity of the door at which a ligature has been detected.

The controller 130 may be mounted on or within the door, e.g. in order to provide a wired connection to the load sensor 120 and angle sensor 110. In other embodiments, the controller 130 may be remote and may communicate wirelessly with the angle sensor 110 and load sensor 120.

The load sensor 120 may be disposed on mounting means associated with the door, such as a hinge or a pivot. When installed, the door applies a load to the mounting means and thus to the load sensor, due predominantly to the weight of the door. The load sensor 120 can detect the applied load and communicate the detected load to the controller 130. The load sensor 120 may continually sample the applied load in order to measure the change in applied load over time, and continually or periodically transmit the measurements to the controller 130 to provide a time series of load values. In some embodiments, the load sensor 120 may comprise a strain gauge or a plurality of strain gauges. As the door moves, i.e. opens and closes, the applied load may vary, and thus it can be difficult to differentiate the normal fluctuating load applied by the door from an abnormal additional load applied in the case of a ligature event.

An angle sensor 110 is disposed on a mounting means of the door, such as on a pivot or hinge, in order to measure the angle between the door and the door frame. The angle sensor

110 may be disposed on the mounting means with the load sensor, however it will be appreciated that in other embodiments the angle sensor 110 may be disposed on a different part of the door, e.g. at a different hinge. In some embodiments the angle sensor 110 may comprise a magnet and magnetic angle detector. Other angle sensors 110 may also be envisaged, such as a rotary encoder, e.g. an optical encoder or a mechanical encoder. The angle sensor 110 is configured to transmit the angle data 115 to the controller 130. As with the load sensor 120, the angle sensor may continually sample the angle of the door in order to measure the change in angle over time, and continually or periodically transmit the measurements to the controller 130 to provide a time series of angle values.

In some embodiments, the angle sensor 110 and the load sensor 120 may be integrated in a load measuring apparatus 1 such as the load measuring device described in WO/2019/220089. An example implementation of the load measuring apparatus 1 according to an embodiment is shown in FIGS. 3 to 6.

With reference to FIGS. 3 to 6, the load measuring apparatus 1 comprises: a main body 2; a pivot cup 4; a magnetic sensor 6 (acting as the angle sensor 110) comprising a magnet 8, a PCB 9, and a magnetic angle detector 10; a first pair of strain gauges 12*a* and 12*b* (acting as a first load sensor 120); a second pair of strain gauges 14*a* and 14*b* (acting as a second load sensor 120); and a load arm 16. Each of the first pair of strain gauges 12*a* and 12*b* and the second pair of strain gauges 14*a* and 14*b* are connected by wheatstone bridges to form a two strain gauge. The pivot cup 4 is positioned at a first end 18 of the load measuring apparatus 1 with the load arm 16 extending away from the pivot cup 4 to a second end 20. The load arm 16 is connected to the pivot cup 4 by a connector 22 having four sides. The first pair of strain gauges 12*a* and 12*b* are mounted onto two opposing sides of the connector 22 and the second pair of strain gauges 14*a* and 14*b* are mounted onto the two remaining opposing sides of the connector 22.

The pivot cup 4 is configured to receive a pivot 24 upon which the load measuring apparatus 1, and any door 26 to which the load measuring apparatus 1 is installed, is mounted. The magnetic sensor 6 is located within the pivot cup 4 such that a pivot 24 received by the pivot cup 4 is attached to the magnetic angle detector 10 of the magnetic sensor 6, such that as the load measuring apparatus 1 and the door 26 within which the load measuring device 1 is installed is opened or closed, the magnet 8 moves relative to the magnetic angle detector 10, thereby allowing the angle between the door and the door frame to be detected.

Figure 5:
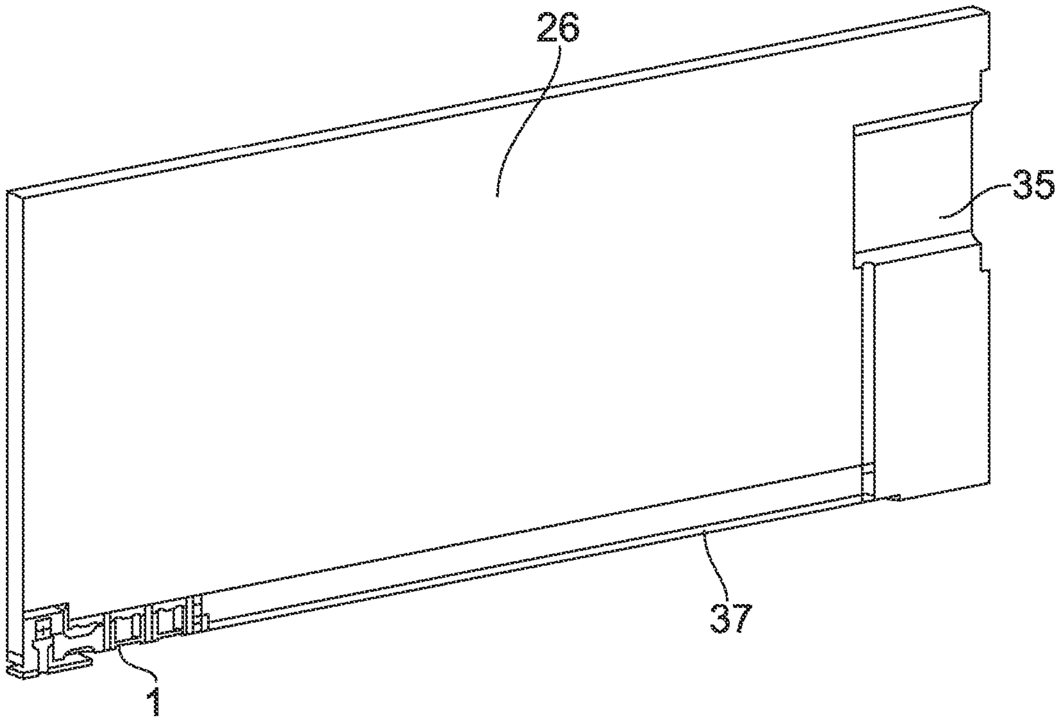
FIG. 5 shows (A) a perspective side view and (B) a zoomed in view of a lower portion of a door having the load measuring apparatus 1 installed.
Figure 5:
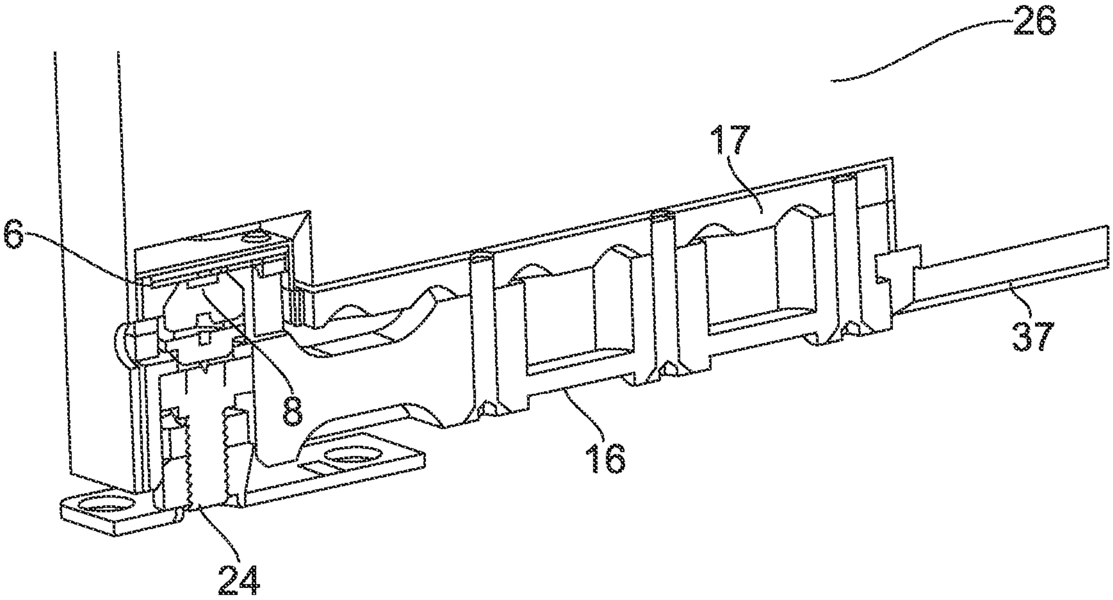

With reference to FIG. 5, the controller 130 may be located in a recess 35 adjacent to a peripheral edge of the door within which the load measuring apparatus 1 is installed and may be electrically connected to the first and second pairs of strain gauges and to the magnetic sensor 6 by wires that pass through a cable channel 37 between the load measuring apparatus 1 and the controller 130.

The load arm 16 further comprises through holes 36. Each through hole 36 allows a screw or bolt to be threaded through the load arm 16 to attach the load measuring device 1 to a carrier bracket 17 within the bottom peripheral edge of a door 26.

Figure 6:
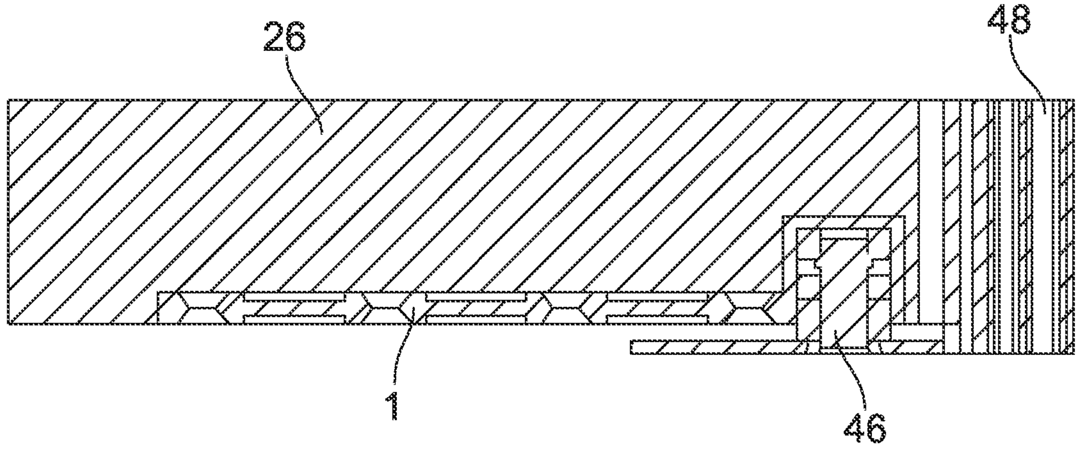
FIG. 6 shows (A) a schematic side view of a door section and (B) a schematic side view of a door having the load measuring apparatus 1 installed.
Figure 6:
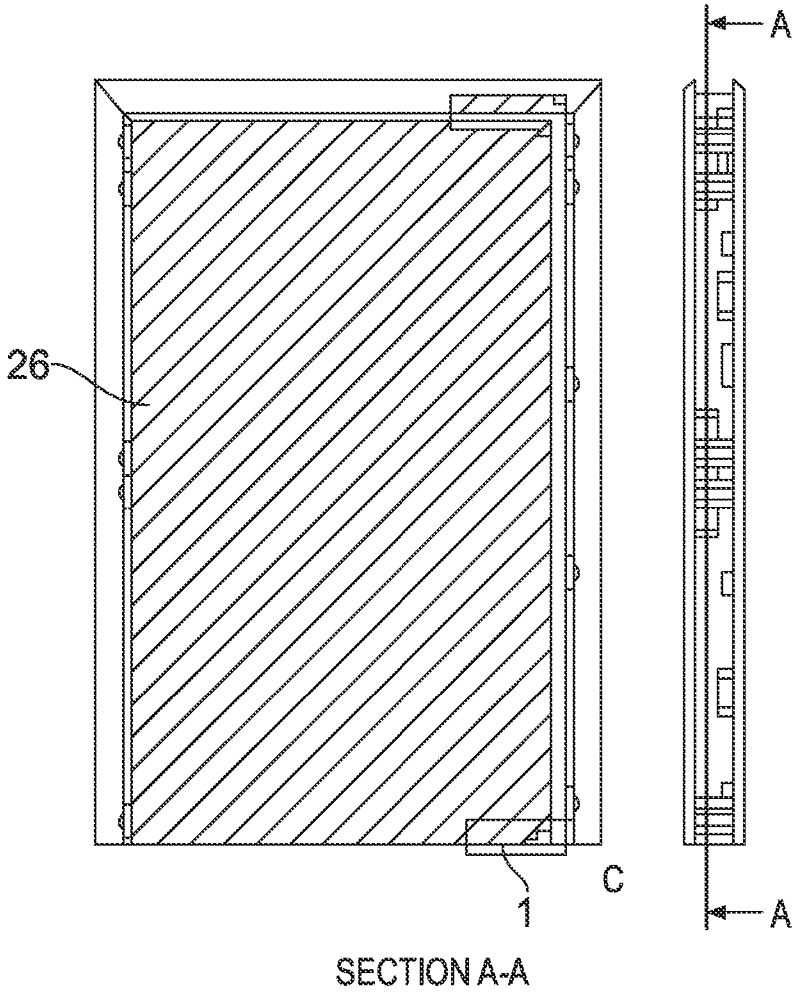

With reference to FIG. 6, the load measuring device 1 is attached to a door 26 by creating a recess within the bottom peripheral edge of a door adjacent to the side edge of the door that will be mounted to a door frame 48. Once the load measuring device 1 has been installed within a door 26, the door 26 is mounted onto a top pivot (not shown) and a bottom pivot 46 within a door frame 48. Accordingly, the door may open and close within the door frame by rotating on the top and bottom pivots.

It will be appreciated that the load sensor 120 as shown in FIGS. 3 to 6 is merely one example of a suitable load sensing apparatus. As will be appreciated, any load sensor 120 suitable for detecting a load applied to a door may be alternatively used. For example, the load sensor 120 may be disposed elsewhere around the door and frame.

In some embodiments, the system 100 may comprise one or more additional sensors for providing further sensing data associated with the door. For example, the system 100 may comprise one or more accelerometers mounted on the door. Each additional sensor may be communicably coupled to the controller 130 and configured to periodically or continually provide sensing data, e.g. accelerometer data, to the controller 130 indicative of measurements captured by the sensor.

Ligature Detection Method

As described above, a ligature can be formed at any point around the door which provides a means for a cord to be tied around or trapped within. Therefore, the sides, bottom and top of the door can all be the site of a ligature point. It is an aim of the invention to accurately detect a ligature when applied to the door.

Once installed, the door applies a load to the load sensor 120, due predominantly to the weight of the door. As the door moves, i.e. opens and closes, the applied load may vary, and thus it can be difficult to differentiate the normal fluctuating load applied by the door from an abnormal additional load applied in the case of a ligature event. In the prior art WO/2019/220089 this problem was addressed by recalibrating a baseline load value each time the door became stationary (i.e. once the load ceases to fluctuate). In this way, an accurate load threshold can be defined each time the door is at rest for the detection of an additional abnormal load. However, a ligature may then go undetected if the load is applied whilst the door is subject to any motion. This may frequently be the case for an open door, and thus the load threshold may only be reliably and accurately defined for a closed door in the system of WO/2019/220089.

Figure 8:
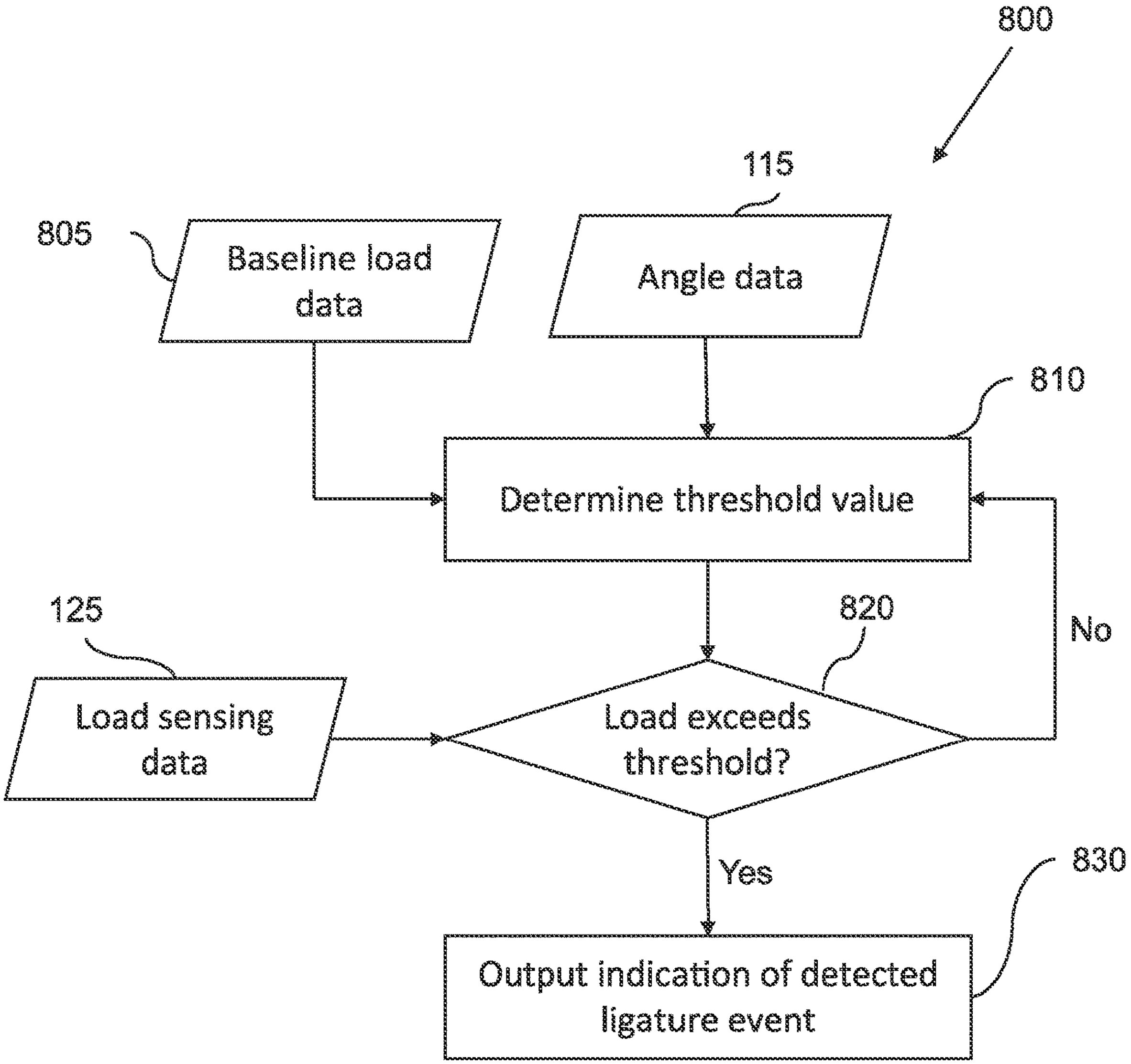
FIG. 8 shows a flow chart of a method 800 according to an embodiment of the invention.

With reference to FIG. 8, there is shown a flow chart of a method 800 for detecting a ligature on a door such as the door 26. According to the method 800, an accurate load threshold may be defined even when the door is in motion or otherwise open, enabling more accurate detection of ligature events. The method 800 is performed by the system 100, in particular elements of the method 800 may be performed by the controller 130.

The method 800 comprises obtaining baseline load data 805. The baseline load data 805 is indicative of an expected load applied by the door to the mounting means as a function of the angle of the door. That is, the baseline load data indicates an expected load to be detected by the load sensor 120 under normal conditions, i.e. in the absence of a ligature event. As discussed, opening and closing the door causes the applied load by the weight of the door to fluctuate. Thus, the baseline load data defines an expected load which varies with the angle of the door. In this way, the baseline load data 805 will indicate a different expected load for the load sensor 120 at a first door angle (e.g. closed, 0°) than at a second door angle (e.g. open at a right angle, 90°). The baseline load data 805 may be preconfigured, and thus obtaining the baseline load data 805 may comprise retrieving the baseline load data 805 from the memory 220 or another location accessible by the controller 130. In other embodiments, the baseline load data 805 may be determined by the controller 130, and thus obtaining the baseline load data 805 may comprise determining or adjusting the baseline load data 805 such as by performing the method 1300 or 1400, as will be explained.

Figure 10:
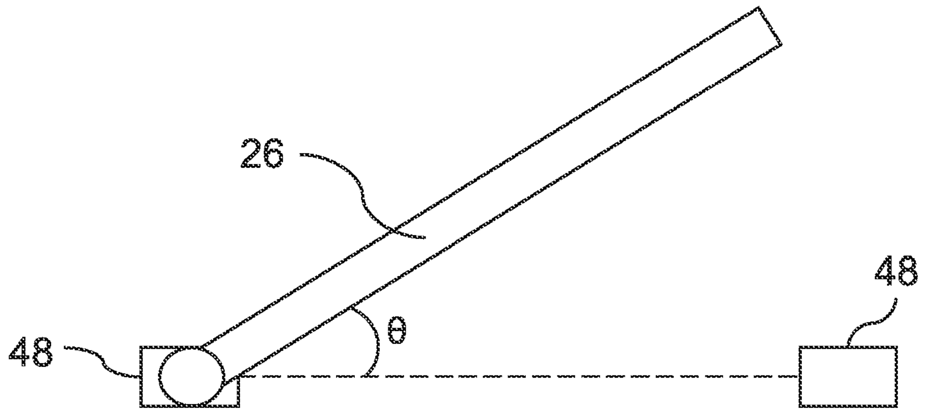
FIG. 10 shows an illustration of a door angle.

As discussed, the door angle can be measured by the angle sensor 110 and is defined as an angle θ between a plane of the door frame 48 and the door 26, as shown in FIG. 10. It will be appreciated that in the case of a double swing door (i.e. a door that can open either outwards or inwards), the door angle θ may be either positive or negative. The baseline load data can indicate the expected load at each angle within a full range of motion of the door.

Figure 9A:
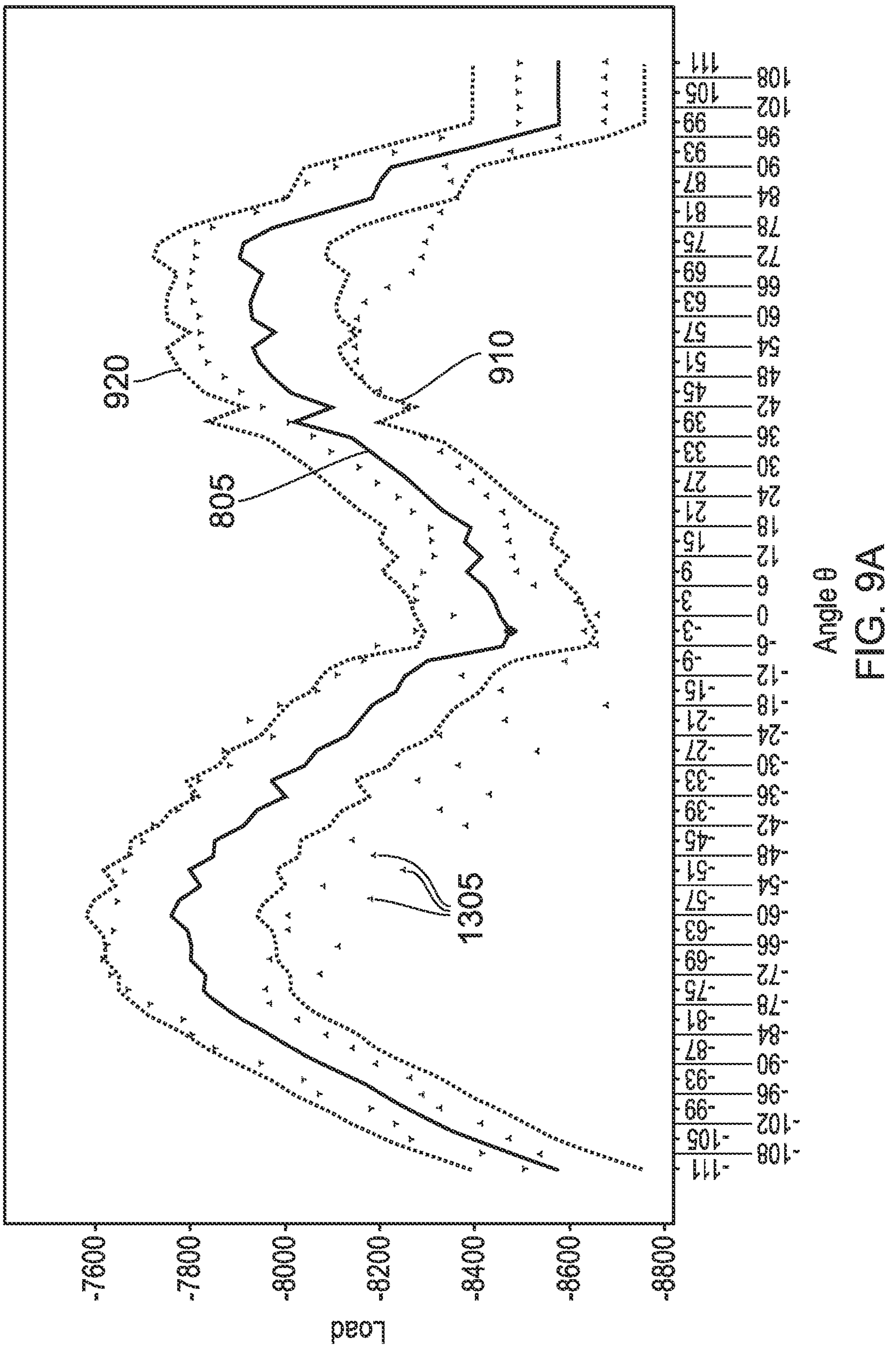
FIG. 9A shows example training data 1305 and baseline load data 805.

With reference to FIG. 9A, the baseline load data 805 defines the expected load as a function of the door angle θ. The baseline load data 805 may thus be represented as shown as a baseline load function, or curve, charting the relationship between expected load and door angle as shown in FIG. 9A. The y-axis represents units of load as may be measured by the load sensor 120, and the x-axis represents the door angle θ across a range of motion for a particular door 26. In this case, the angle θ ranges between −111° and 111°, however it will be appreciated that the range of door angle θ indicated by the baseline load data 805 will vary depending on the range of motion of the particular door 26 for which the system 100 is installed. In some embodiments, the baseline load function may depend on one or more variables in addition to door angle. For example, the baseline load function may be a function of door speed θ' (i.e. rate of change of door angle) and/or door acceleration θ'' (i.e. rate of change of door speed). The baseline load function may depend on one or more variables captured by the additional sensors associated with the system (such as force applied to the door, as derived from measurements captured by an accelerometer). Thus, the baseline load data 805 may be represented as a surface in N-dimensional space, wherein N is the number of variables on which the baseline load is dependent.

In some embodiments, the baseline load data 805 may be dependent on door direction (i.e., the direction of the door speed θ'). This is because the baseline load experienced may depend on the direction in which the door is moving.

Figure 9B:
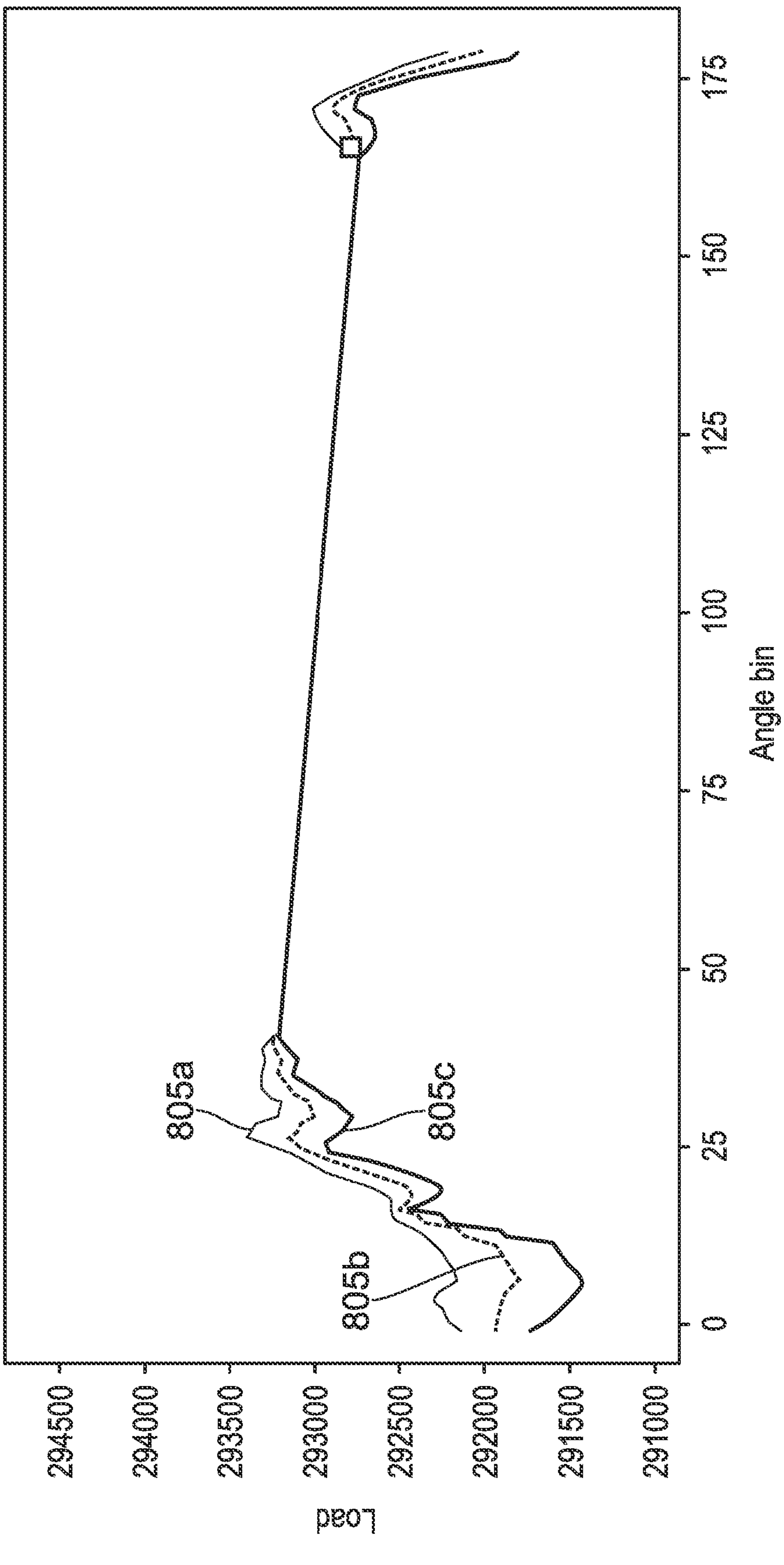
FIG. 9B shows an example of positive baseline load data 805*a*, negative baseline load data 805*c* and static baseline load data 805*b;*

With reference to FIG. 9B, the baseline load data 805 may therefore be expressed as three separate data sets: positive baseline load data 805*a* (for when the door is moving in a first direction causing a positive value of θ'), negative baseline load data 805*c* (for when the door is moving in a second direction causing a negative value of θ') and static baseline load data 805*b* (for when the door is stationary and θ'=0). Each of the positive, negative and static baseline load data defines an expected load for each door angle θ across a range of motion for the door when moving in the respective direction (or when static, for the case of the static baseline load data 805*b*). As can be seen, the positive baseline load is in the illustrated case generally higher for each angle than the negative baseline load for a given angle, with the static baseline load being in the middle of the two. This may depend on the door geometry and in which direction it is actively pushed by a user.

Note that in the data shown in FIG. 9B, the angle θ is defined in bins from bin 0 to bin 180. The bin 0 corresponds to an angle of 0° to 2° and bin 180 corresponds to an angle of 358° to 360° (i.e. −2° to) 0°. As a result, the linear portion in the centre of the graph corresponds to angle bins in which the door cannot move.

The baseline load data 805 may be predetermined during a training phase and stored in the memory 220 or otherwise accessible to the controller. Thus, obtaining the baseline load data 805 may comprise retrieving the baseline load data 805. In some embodiments, the baseline load data 805 may be updated over time, e.g. as a rolling average based on ongoing readings from the load sensor 120 and angle sensor 110. Thus, obtaining the baseline load data 805 in the method 800 may comprise determining or updating the baseline load data 805. A method of initially determining the baseline load data 805 will be described in more detail with reference to FIG. 13. One method of updating the baseline load data 805 during use will be described with reference to FIG. 14.

The method 800 comprises receiving angle data 115. The angle data 115 is received from the angle sensor 110, as has been explained, and provides an indication of a current door angle θ. The angle data 115 may be received continually or periodically such that the received angle data 115 is updated as the door angle changes over time. The controller 130 may derive a current door speed θ' as a rate of change of the door angle θ from the angle data 115. The controller may further derive a current door acceleration θ' as a rate of change of the door speed θ'. The controller may further derive a door direction in dependence on whether θ' is positive, negative or zero.

The method 800 comprises a step 810 of determining a threshold value of load. The threshold value is determined in dependence on the baseline load data 805 and the angle data 115 to reflect the expected load for the current door angle θ. As discussed, the baseline load data 805 may comprise positive baseline load data 805*a*, negative baseline load data 805*c* and static baseline load data 805*b*. The relevant baseline load data 805 may therefore be retrieved in step 810 in dependence on the door direction. The expected load for the current door angle θ is derived from the relevant baseline load data 805. For example, if the door is moving in a positive direction, the expected load for the current door angle θ is derived from the positive baseline load data 805*a*. As discussed, the baseline load data 805 may also define that the expected load varies as a function of door speed θ' or door acceleration θ''. A current door speed may be derived from the angle data 115 as a rate of change of the measured angle of the angle data 115. Furthermore, the current door acceleration may be derived from the angle data 115 as a rate of change of the determined door speed. Step 810 may thus comprise deriving from the baseline load data 805 an expected load corresponding to a current door angle θ, door direction, current door speed θ' and/or a current door acceleration θ''. Step 810 then comprises determining a threshold load value at a predetermined offset from the expected load value, wherein the predetermined offset is indicative of an abnormal fluctuation from the expected load which may derive from a ligature event.

In some embodiments, both a positive threshold and a negative threshold may be determined in step 810. The positive threshold may be defined at an offset above the expected load value, and the negative threshold may be defined at an offset below the expected load value. The offset may be determined to correspond to the effect of a particular mass being applied to the door, e.g. a mass of between 3 kg to 6 kg. A suitable offset may be determined experimentally, to be higher than the normal fluctuation of the load sensor 110 but lower than that applied by a ligature event. In some embodiments, the offset may be defined in dependence on the normal fluctuation of the load sensor 110, for example as defined by a standard deviation of load readings for a given angle in the absence of a ligature. The offset may be determined as a variable in dependence on the door angle. That is, a different offset may be defined for different door angles. In some embodiments, a larger offset may be determined for larger (i.e. wider) door angles, in order to reflect the reduced likelihood of a ligature event with the door widely open and thereby to reduce the frequency of false alarms. The offset may also be determined as a variable in dependence on the speed (rate of change of door angle), direction or the acceleration of the door (rate of change of speed). For example, if the door is moving or accelerating more quickly, the threshold may be defined to increase as the door speed increases and/or if the door acceleration increases.

If the system comprises one or more additional sensors, the offset may be determined as a variable in dependence on a value of any other parameter measurable by the additional sensors. For example, the system may comprise an accelerometer, and the offset may be determined as a variable in dependence on the accelerometer reading. This may be beneficial as an accelerometer reading may capture impact or force applied to the door (e.g. by a patient kicking a door or door frame) which could indicate abuse of the system, and thus a likelihood of a false alarm (and so the threshold may be increased to reflect that).

With reference to FIG. 9A, a positive threshold 910 and a negative threshold 920 are illustrated in conjunction with the expected load defined by the baseline load data 805 according to one example. As can be seen, the positive threshold 910 is at a load value a predetermined offset above the expected load, and the negative threshold 920 is at a load value a predetermined offset below the expected load. Each of the positive threshold 910 and the negative threshold 920 vary with door angle θ analogously to the expected load, to reflect the fluctuation in expected load with door angle. Step 810 may then define determining both the positive threshold 910 and the negative threshold 920 for the current door angle θ indicated by the angle data 115. The positive threshold 910 and the negative threshold 920 define the upper and lower bounds of an expected load window, wherein if the load measured by the load sensor 120 falls outside the expected load window, it is indicative of an abnormal load such as a ligature event.

A different curve representing the positive threshold 910 and negative threshold 920 may also be defined for each of the positive baseline load data 805*a*, negative baseline load data 805*c* and static baseline load data 805*b* in embodiments wherein these baselines are separately defined.

As discussed, the angle data 115 is continually or periodically received during the method 800, and so the current door angle θ as indicated by the angle data 115 (and also the door direction, speed θ' and acceleration θ'' derivable from the angle data 115) can change over time. As the expected load, and thus the determined threshold, vary in dependence on the door angle, and optionally direction, speed and/or acceleration, as shown in FIGS. 9A and 9B, step 810 may be repeated periodically to update the threshold value(s) to reflect the updated angle data 115 when the angle of the door changes.

The method 800 comprises receiving the load sensing data 125 from the load sensor 120. As discussed, the load sensing data 125 is indicative of a current load exerted on the mounting means by the door. The load sensing data 125 is provided continually or periodically during execution of the method 800 to reflect the change in the detected load over time.

In step 820, it is determined whether the load indicated by the load sensing data 125 exceeds the threshold value determined in step 810. If both a positive threshold 910 and a negative threshold 920 are determined, the load is determined to exceed the threshold in step 820 if the load is greater than the positive threshold value or is less than the negative threshold value.

If the load does not exceed the threshold, it may be determined that no ligature event is detected. Steps 810 and 820 may be performed in a continuous or periodic loop to continue to update the threshold value in dependence on the current door angle θ and monitor the detected load against the up to date threshold.

If the load is determined to exceed the threshold in step 820, the method may proceed to step 830. In step 830, the method determines that a ligature event has been detected, and an indication of the detected ligature event is output. In step 820, the communication module can transmit an alarm signal to an external alarm system to activate the external alarm.

It can be seen that short fluctuations in load may occur indicative of noise or other non-ligature events when opening or closing the door. As such, it may be desired to differentiate between non-ligature fluctuations and ligature events, to reduce the occurrence of false alarms. To address this, a specified time period may be defined, and it may only be determined that a ligature event is detected if the threshold is exceeded for at least the specified time period. The choice of specified time period should be sufficiently long to eliminate noise fluctuations, however sufficiently short such that an unnecessary delay in raising an alarm is avoided. A suitable specified time period may be defined as between 3 seconds and 5 seconds, such as 4 seconds or 3.5 seconds. In some embodiments, the specified time period may be randomised within a range during each iteration of the method 800, such as a range of between 2 and 6 seconds. By randomising the specified time period, the opportunity for a patient learning how to trigger a false or nuisance alarm may be reduced.

Once it is determined that the load exceeds the threshold in step 820, the method 800 may comprise starting a timer. The method may continue to perform steps 810 and 820 in a loop whilst the timer is running to update the threshold value and determine whether the load continues to exceed the threshold value. "Continues to exceed" the threshold value may not mean remains above the threshold continually, but rather may mean that it is determined that the load spends at least a predetermined portion of the specified period above the threshold. The predetermined portion may be e.g. 80%. Thus, if the detected load exceeds the threshold for at least 80% of the specified period, it may be determined that the door exceeds threshold value for at least a specified period. In this way, loads which hover around the threshold but do not continuously exceed due to sensor fluctuations can be captured.

If the load is determined to no longer exceed the threshold in step 820 during an iteration of the loop whilst the timer is running, the timer may be reset. The method may only proceed to step 830 if the timer reaches at least the specified time period. In this way, fluctuations lasting less than the specified time period will not be flagged as a ligature event. In some embodiments, some hysteresis may be applied in order to determine whether the load continues to exceed the threshold value, in order to account for noise. That is, a single load value falling below the threshold may be insufficient to reset the timer. The method 800 may comprise determining that the load no longer exceeds the threshold only if a predetermined number of load values in the load sensing data 125 do not exceed the threshold after the timer has been started. For example, the predetermined number of load values may be set as 4 values or 5 values. In this way, a single erroneous fluctuation below the threshold will be insufficient to restart the timer. Only if the load sensing data 125 consistently indicates that the load no longer exceeds the threshold will the timer be reset and the method 800 restarted.

Figure 11:
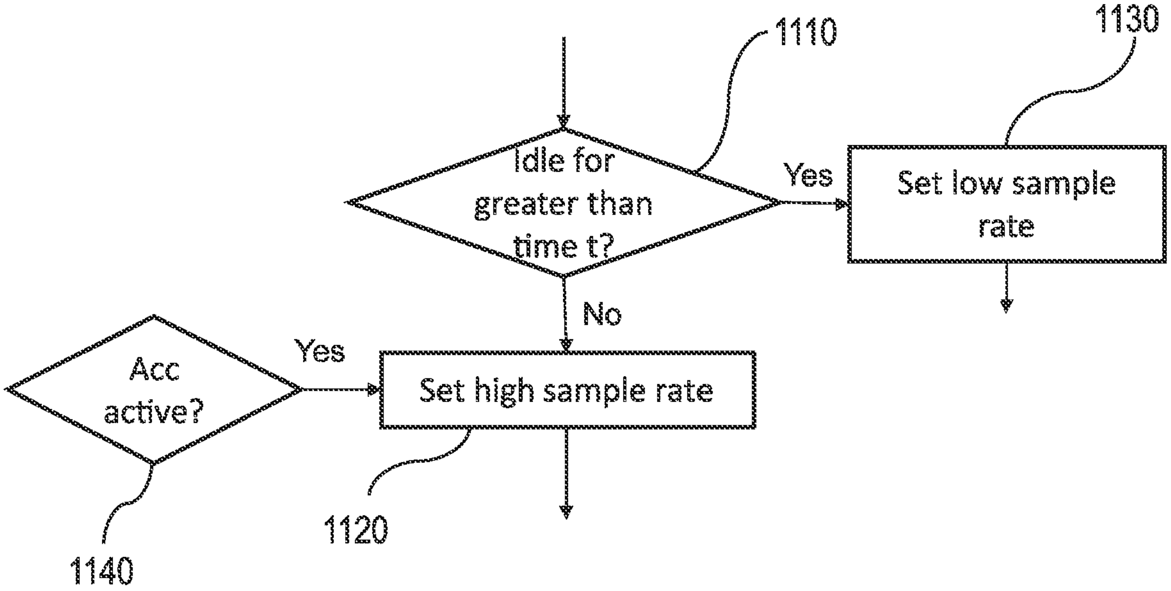
FIG. 11 shows an example method for conserving energy during operation of the system 100.

With reference to FIG. 11, there is shown an optional method for reducing the power consumption of the system 100. The method shown in FIG. 11 may be performed as part of the method 800, for example, after step 820 when it is determined that the load does not exceed the threshold. However, the method shown in FIG. 11 may be performed at any point during the method 800 or concurrently to the method 800.

In step 1110, the controller determines whether the system 100 has been idle for greater than a threshold time. This determination may be made in dependence on the accelerometer data 145 received from the accelerometer. If the accelerometer 140 has been inactive for greater than a threshold time, the controller 130 determines that the system is idle, i.e., the door is not in use. The threshold time may be predefined and adjustable depending on typical door use where the system 100 is implemented. In some embodiments, the threshold time is between 30 seconds and two minutes, for example 60 seconds.

If the controller 130 determines the system is not idle, the method proceeds to step 1120 and the controller 130 sets a first sample rate for the collection of data during the method 800. If the first sample rate is already in use, then the controller 130 makes no change to the sample rate. The first sample rate is a high sample rate to allow a high granularity in the detection of load. The first sample rate is applied to each of the load sensor 120 and the angle sensor 110. Thus, each of the load sensor 120 and angle sensor 110 are arranged to continue to capture and transmit data to the controller 130 in the method 800 according to the first sample rate.

If the controller 130 determines that the system is idle in step 1110, the method proceeds to step 1130. In step 1130, the controller 130 reduces the sample rate for collection of data to a second sample rate. The second sample rate is lower than the first sample rate, to conserve power for the load sensor 120, angle sensor 110 and controller 130. Thus, the system 100 is arranged to operate in a low power mode when the door is idle and the load sensor 120 and angle sensor 110 are controlled to collect and transmit data less frequently. The method 800 then continues according to the second sample rate.

At any time during the operation of method 800 when the system is operating in the second sample rate, if the accelerometer 140 is activated, the controller 130 proceeds back to step 1120 to set the sample rate back to the first, high sample rate as the door is no longer idle. The accelerometer 140 being activated is detected from the accelerometer data 145 being non-zero or above a threshold.

Figure 12:
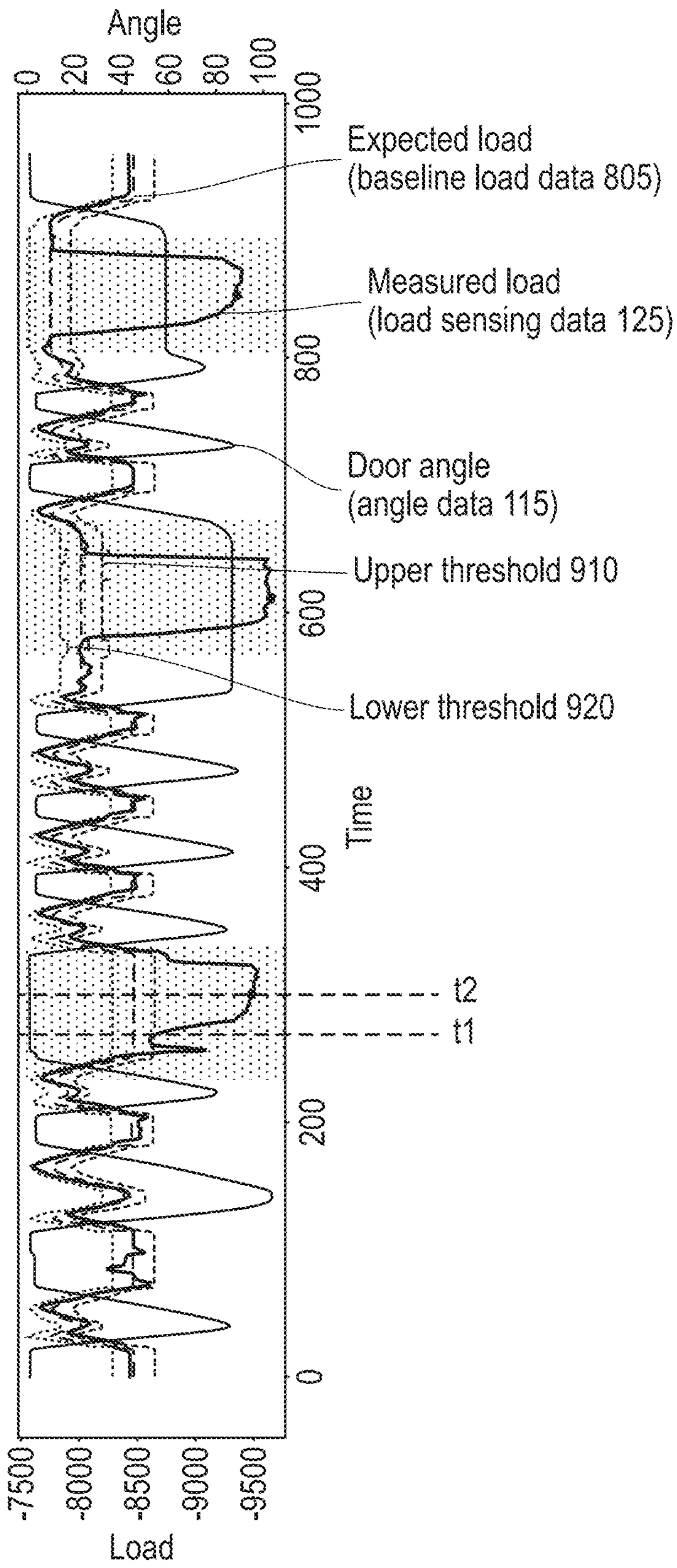
FIG. 12 shows example data obtained during the method 800.

With reference to FIG. 12, there is shown data collected during performance of the method 800. The expected load defined by the baseline load data 805, the upper threshold 910, the lower threshold 920, the door angle defined by the angle data 115 and the measured load defined by the load sensing data 125 are plotted together against time as the door angle is fluctuated and an abnormal load is applied to the door periodically.

At time t1, it can be seen that the measured load is determined to exceed the threshold 910, and thus a timer is initiated. Between t1 and t2, the measured load continues to exceed the threshold, and thus the timer continues to run. At time t2, the timer reaches the specified time period and the method proceeds to step 830, as it is determined that a ligature event has occurred and thus an external alarm can be triggered.

The present invention thus provides a robust method of ligature detection. Accurate thresholds can be tailored to the angle of the door, and optionally the speed of the door or acceleration of the door, thus accounting for the fluctuations in load applied as the door is opened and closed. In this way, an abnormal load can be detected even if the door is in motion.

Initial Determination of Baseline Load

Figure 13:
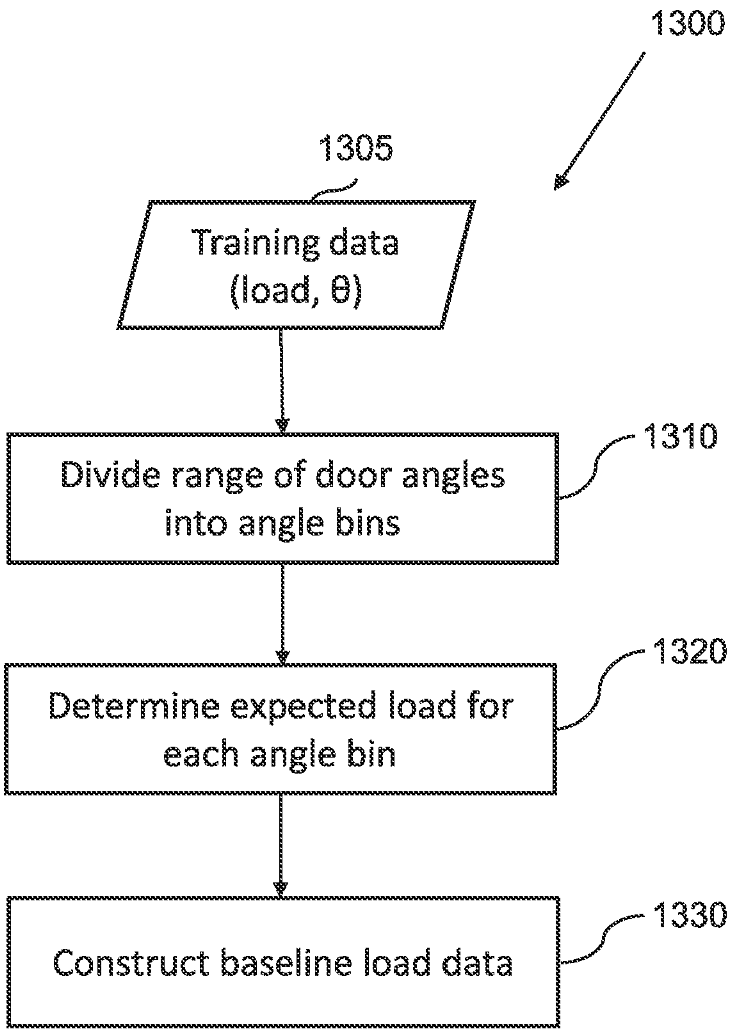
FIG. 13 shows a flow chart of a method 1300 for obtaining baseline load data according to an embodiment.

With reference to FIG. 13, there is provided a method 1300 of initialising the baseline load data 805. The method 1300 may be performed by the controller 130.

The method 1300 comprises receiving training data 1305. The training data 1305 may be obtained during a dedicated training phase, e.g. during configuration of the system 100. In other embodiments, the training data 1305 may be collected during normal use of the system 100.

The training data 1305 is indicative of load measurements taken by the load sensor 120 at a range of door angles θ. An example portion of training data 1305 is shown in FIG. 9A alongside the resultant baseline load data 805. The portion of the training data 1305 shown is that of selected minimum and maximum load measurements of the training data 1305. The training data 1305 may thus comprise a plurality of load values and a corresponding plurality of door angle values obtained from the angle sensor 110. The training data 1305 may be collected separately for each of a positive and negative door direction to obtain the positive baseline load data 805*a* and negative baseline load data 805*c*. The training data 1305 may in some embodiments also comprise a corresponding door speed value (θ') and/or door acceleration value (θ") for each load value. The subset of load values are shown plotted against the corresponding door angle in FIG. 9A. The training data 1305 may be constructed to comprise load values taken over a full range of motion of the door in each door direction. That is, the range of door angles θ may extend over a full range of motion of the door relative to the door frame in use. This may be provided e.g. during a training phase by fully extending the door over the range of its swing and collecting angle data 115 and load sensing data 125 during the extent, such as is shown in FIG. 9A. The door may be extended over the range of its swing several times, in order to ensure good coverage of different angles, directions and door speeds.

In step 1310, the range of door angles is divided into angle bins, each angle bin defining a sub-range of door angles. The angle bins together extend across the range of door angles of the training data 1305. Providing fewer angle bins each having a wide sub-range beneficially enables more load values to be encompassed in the sub-range, which will reduce the effect of any anomalous values on the determination of an expected load. The sub-range should wide enough such that it encompasses a plurality of the load values of the training data, to facilitate averaging. However, keeping the sub-range narrow provides improved granularity in the determined expected load. For example, suitable angle bins may define a sub-range of 1°, 2° or 3° in some embodiments. Smaller angle bins defining smaller sub-ranges may be suitable for training data having a large concentration of load values. In the examples shown in FIGS. 9A and 9B, the range of door angles is divided into angle bins of 2°. Step 1310 may further comprise providing bins for other dimensions provided in the training data 1305 such as door speed θ' and door acceleration θ". Each bin may then be associated with a predetermined range of each dimension (angle, speed, acceleration). Reference will be made to angle bins, however it will be appreciated that the subsequent steps can be equally applied to bins having further associated dimension ranges in addition to the angle range such as a particular range of door speed.

In step 1320, an expected load value for each angle bin is determined by averaging the plurality of load values in each angle bin. Any averaging operation may be used, such as a mode, a geometric mean or an arithmetic mean of the load values having corresponding angles in the respective angle bin. As discussed, if the bin has further associated dimension ranges the averaging will be over the load values having corresponding dimensions falling within each defined range (e.g. a corresponding door angle within the angle range defined for the bin, and a corresponding door speed within the speed range defined for the bin).

In step 1330, the baseline load data 805 is constructed in dependence on the expected load values derived in step 1320. The baseline load data 805 may be represented as a baseline load function 805 indicating the relationship between expected load and angle (and optionally speed and/or acceleration). An example baseline load function 805 derived from the training data 1305 is shown in FIG. 9A. The baseline load data 805 may be constructed to indicate that each angle is assigned the expected load value determined for its angle bin in step 1320. In other embodiments, the expected load values may be interpolated between each angle bin to provide the baseline load function 805. For example, the expected load derived for the angle bin may be assigned to an angle within the bin, such as in the centre of the bin, and the expected load for the intermediate angles may be filled in by linear interpolation. In this way, a smoother baseline load function 805 can be provided.

Steps 1310, 1320 and 1330 may be performed separately for training data 1305 collected in a positive direction and a negative direction to obtain separate positive baseline load data 805*a* and negative baseline load data 805*c*. Static baseline load data 805*b* may then optionally be constructed as a combination of the positive baseline load data 805*a* and negative baseline load data 805*c*, for example as an average of the positive and negative baseline load data.

The method 1300 may be performed in an initial training phase. The training data may be captured periodically, and as such the controller 130 may receive updated training data 1305 and update the baseline load data 805 by performing the method 1300 each time updated training data 1305 is received. The training data 1305 may be collected during controlled training conditions in some embodiments. However, in other embodiments, the training data 1305 may comprise the angle data 115 and load sensing data 125 collected during normal use of the system 100, as will be explained. In this way, a rolling average for each angle bin can be calculated and periodically updated as the angle data 115 and load sensing data 125 is received. Thus, the method 1300 may be performed periodically using accumulated angle data 115 and load sensing data 125 stored in the memory 220 to update the expected load for each angle bin.

Update of Baseline Load

In some embodiments, the system 100 is arranged to continually update the baseline load data 805 during operation. This can be useful as continued use of the door can cause the expected load to shift over time, leading to inaccurate baselines. To account for this, the baseline load data 805 can be continually updated based on the received angle data 115 and load sensing data 125 during the method 800.

Figure 14:
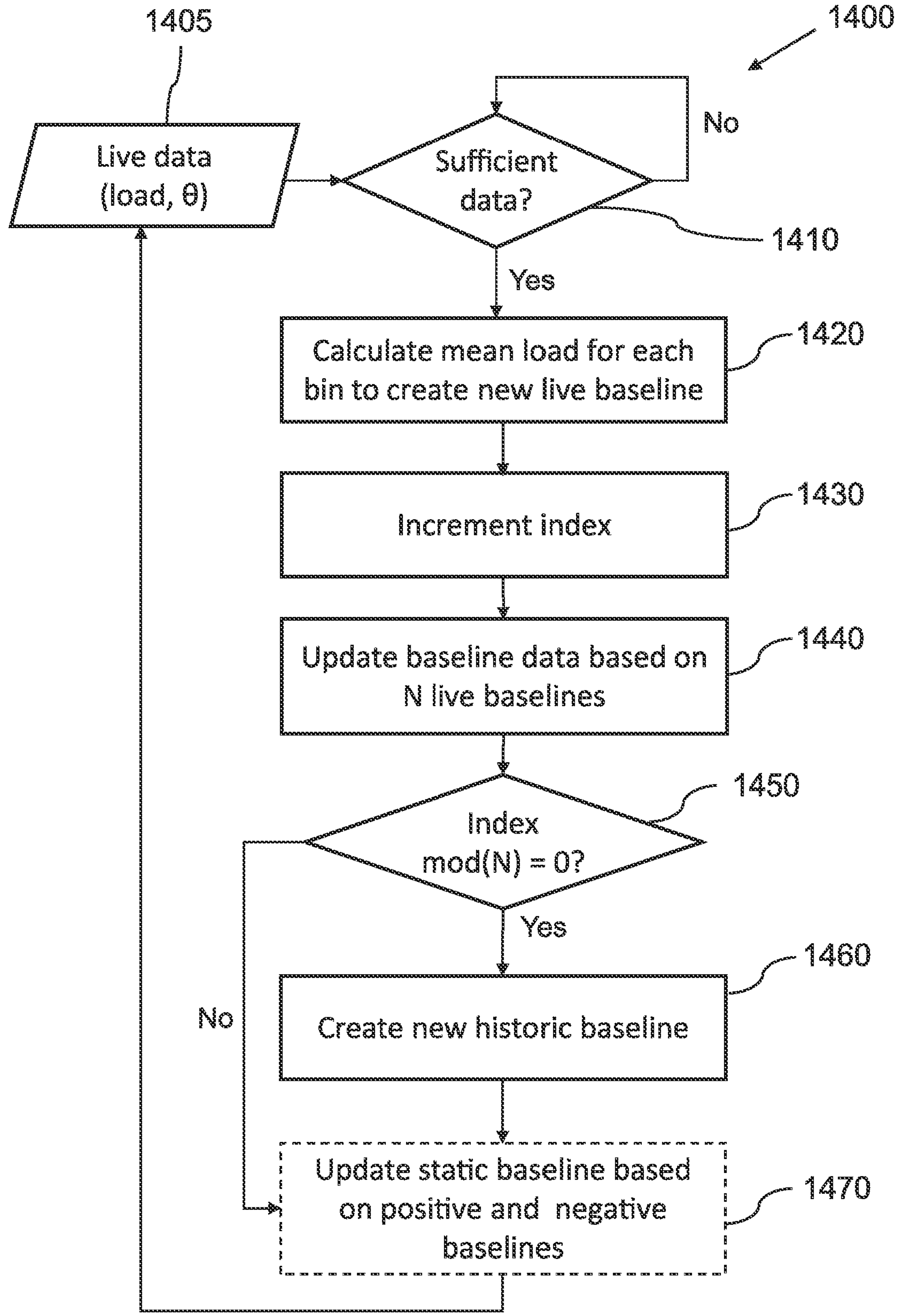
FIG. 14 shows a flow chart of a method 1400 for updating baseline load data according to an embodiment.

With reference to FIG. 14, there is illustrated a method of updating the baseline load data 805 during use of the system 100.

Live load data 1405 is received by the controller 130. The live load data 1405 corresponds to angle data 115 and corresponding load sensing data 125 captured during operation of method 800. The angle data 115 and load sensing data 125 is only included in the live load data 1405 if the load does not exceed the threshold in step 820, i.e., only angle data 115 and load sensing data 125 during normal operation of the door are included.

In step 1410, it is determined whether sufficient live load data 1405 has been received in this iteration. That is, whether the live load data 1405 received so far during this iteration meets a sufficiency criteria. The sufficiency criteria may comprise a threshold volume of data, or a threshold range of data, or both. For example, the sufficiency criteria may comprise a threshold number of angle bins which the live load data 1405 should include, such as ten different bins, twelve different bins, fifteen different bins or the like. Optionally, the sufficiency criteria may include a threshold number of load readings in each angle bin. The live load data 1405 continues to be received until the sufficiency criteria are met.

Once the sufficiency criteria is met, in step 1420 a mean load is calculated for each angle bin included in the live load data 1405 to create a new live baseline. The mean load is calculated based on the most recent N load readings for that bin plus one historic load reading. The historic load reading is based on a historic baseline calculated during earlier iterations of the method 1400 and will be explained further below. That is, for each angle bin, the mean load is calculated as (total load)/(number of visits) over the most recent N load readings and the historic load reading. N may be tailored to the amount of data received, but typically a value of around 8, 10 or 12 works sufficiently for the present embodiment.

In step 1430, an index is incremented. The index tracks the number of live baselines created. The live baseline constructed in step 1420 may be stored accessible to the controller 130.

In step 1440, the baseline data 805 is updated. The baseline data 805 is updated by averaging the past N live baselines constructed during the past N indexes. As the live baselines are only constructed to include recent measurements, they may not be complete over the full range of motion of the door, i.e., some angle bins may be empty. If an angle bin is empty after averaging the past N live baselines, this may be filled by interpolation, such as linear interpolation.

In step 1450, it is determined whether the current index modulus N is equal to zero, i.e., whether the current index is a multiple of N. If the current index is a multiple of N, a new historic baseline is constructed in step 1460. The historic baseline is constructed as an average of the previous historic baseline with the most recent N live baselines.

By creating a new historic baseline every N iterations, this provides the effect of giving progressively less weight to older measurements during the rolling average. That is, one historic measurement will be included in the average for every N updated measurements.

In embodiments wherein the positive baseline data 805*a*, negative baseline data 805*c* and static baseline data 805*b* are defined separately, the steps 1410 to 1460 may be performed independently for the positive baseline data 805*a* and negative baseline data 805*b* based on live load data 1405 in each respective direction. Optionally, in step 1470, the static baseline data 805*b* may be updated as an average of the updated positive baseline data 805*a* and negative baseline data 805*c*. Additionally or alternatively, steps 1410 to 1460 may be performed independently for the static baseline data 805*b* based on live load data 1405 captured when the door is static.

Thus, the method 1400 effectively updates the baseline load data 805 based on a rolling weighted average of live load data 1405 to account for any drift in expected load during use of the door.

Alternative methods for updating the baseline load data 805 can also be envisaged which are not based on a rolling average. For example, in some embodiments, the method 1400 may instead compare the live baseline constructed in step 1420 to the current baseline load data 805. This comparative method may take place as an alternative to steps 1430 to 1460.

For example, the method may instead comprise determining whether the live baseline constructed in step 1420 has the same shape as the current baseline load data 805. This may be performed for example using a Pearson Correlation Coefficient or other statistical measure. If the shape of the live baseline is determined to differ from the current baseline load data 805, the baseline load data 805 may be updated with a linearly interpolated version of the live baseline.

If the shape is the same, the method may further comprise determining whether the live baseline has been scaled or translated in comparison to the baseline load data 805. This determination may use a metric such as a linear fit between the live baseline and the baseline load data 805. If the live baseline is determined to be scaled or translated, the method may comprise updating the baseline load data 805 by applying an appropriate scale or translation to the baseline load data 805 to match the live baseline.

The term 'processor' is to be interpreted broadly to include a CPU, processing unit, ASIC, logic unit, or programmable gate array etc, and may refer to a single processor or a combination of several processors. Certain aspects of the disclosure may be implemented using machine-readable instructions which may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The functional modules may be implemented in a single processor or divided amongst several processors.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A controller for detecting a ligature on a door mounted within a door frame on a mount, comprising:

a communication module configured to receive, from a load sensor, load sensing data indicative of a detected load applied by the door to the mount, and receive, from an angle sensor, angle data indicative of a measured angle of the door relative to the door frame;

one or more processors; and a memory storing computer executable instructions therein which, when executed by the one or more processors, cause the one or more processors to:

obtain baseline load data indicative of an expected load applied by the door to the mount as a function of the angle of the door, wherein the baseline load data indicates a relationship between expected load applied by the door to the mount and the angle of the door, the baseline load data indicating a different expected load at a first angle of the door than at a second angle of the door;

determine a threshold load value indicative of a ligature on the door for the measured angle in dependence on the baseline load data and the angle data;

determine whether the load indicated by the load sensing data exceeds the threshold load value for the measured angle; and output an indication of a detected ligature event if the load exceeds the threshold load value.

2. The controller of claim 1, wherein the baseline load data is indicative of an expected load applied by the door to the mount at each angle within a range of motion of the door.

3. The controller of claim 1, wherein the baseline load data is dependent on a direction of motion of the door.

4. The controller of claim 3, wherein the baseline load data comprises:

positive baseline load data indicative of the expected load as a function of the angle of the door when the door is moving in a first direction;

negative baseline load data indicative of the expected load as a function of the angle of the door when the door is moving in a second direction; and static baseline load data indicative of the expected load as a function of the angle of the door when the door is static.

5. The controller of claim 1, wherein the one or more processors are configured to obtain the baseline load data by:

receiving training data indicative of measurements taken by the load sensor in the absence of a ligature, the training data comprising a set of load values each having an associated door angle across a range of door angles;

dividing the range of door angles into a plurality of angle bins each defining a sub-range of door angles, each angle bin being associated with a plurality of the load values; and averaging the plurality of load values for each angle bin to determine the expected load for the angle bin.

6. The controller of claim 5, wherein the one or more processors are configured to obtain the baseline load data by interpolating the expected load between each angle bin to provide a baseline load function, the baseline load function defining an expected load at each door angle within a range of motion of the door.

7. The controller of claim 5, wherein the range of door angles of the training data extends over a full range of motion of the door relative to the door frame in use.

8. The controller of claim 1, wherein the one or more processors are configured to:

create a live baseline based on a weighted rolling average of the received load sensing data at each angle; and update the baseline load data in dependence on the live baseline.

9. The controller of claim 8, wherein the rolling average is weighted to provide less weight to older received load sensing data.

10. The controller of claim 1, wherein the one or more processors are configured to determine the threshold value as a predetermined offset from the expected load value corresponding to the measured angle of the door.

11. The controller of claim 1, wherein the one or more processors are configured to:

determine a positive threshold value greater than the expected load value and a negative threshold value less than the expected load value, and determine the load indicated by the load sensing data exceeds the threshold value if the load is greater than the positive threshold value or is less than the negative threshold value.

12. The controller of claim 1, wherein the communication module is configured to continue to receive the angle data from the angle sensor, and wherein the one or more processors are configured to update the threshold value when the measured angle of the door changes.

13. The controller of claim 1, wherein the communication module is configured to continue to receive the load sensing data from the load sensor, and wherein the one or more processors are configured to continually determine whether the load indicated by the load sensing data exceeds the threshold value.

14. The controller of claim 13, wherein the one or more processors are configured to output the indication if the load applied by the door continues to exceed the threshold value for at least a specified period.

15. The controller of claim 1, wherein the communication module is configured to transmit an alarm signal to an external alarm system to activate the external alarm in response to the indication of a detected ligature event being output by the one or more processors.

16. A system for detecting a ligature on a door, comprising:

a controller according to claim 1;

a mount configured to mount the door within a door frame;

an angle sensor configured to detect an angle of the door with respect to the door frame and transmit angle data indicative of the angle of the door to the controller; and at least one load sensor configured to determine the load applied to the mount by the door and transmit load sensing data indicative of the load to the controller.

17. The system of claim 16, wherein the at least one load sensor comprises a strain gauge, and/or wherein the angle sensor comprises a magnet and magnetic angle detector.

18. The system of claim 16, further comprising a door mounted within a door frame by the mount, wherein the controller, angle sensor and at least one load sensor are integrated with the door.

19. A computer-implemented method for detecting a ligature on a door mounted within a door frame on a mount, comprising:

detecting, at a load sensor, a load applied by the door to the mount;

detecting, at an angle sensor, an angle of the door relative to the door frame;

obtaining baseline load data indicative of an expected load applied by the door to the mount as a function of the angle of the door, wherein the baseline load data indicates a relationship between expected load applied by the door to the mount and the angle of the door, the baseline load data indicating a different expected load at a first angle of the door than at a second angle of the door;

determining a threshold load value indicative of a ligature on the door for the measured angle in dependence on the baseline load data and the detected angle of the door;

determining whether the detected load exceeds the threshold load value for the detected angle; and outputting an indication of a detected ligature event if the detected load exceeds the threshold load value.

20. The method of claim 19, wherein obtaining the baseline load data comprises in a training phase:

taking, at the load sensor, measurements of the load applied to the door in the absence of a ligature across a range of door angles, the measurements comprising a set of load values each having an associated door angle;

dividing the range of door angles into a plurality of angle bins each defining a sub-range of door angles, each angle bin being associated with a plurality of the load values; and averaging the plurality of load values for each angle bin to determine the expected load for the angle bin.

21. The method of claim 20, wherein obtaining the baseline load data comprises interpolating the expected load between each angle bin to provide a baseline load function, the baseline load function defining an expected load at each door angle within a range of motion of the door.

22. The method of claim 19, comprising:

creating a live baseline based on a weighted rolling average of the detected load at each angle; and update the baseline load data in dependence on the live baseline.

23. The method of claim 19, comprising continually detecting the angle of the door by the angle sensor, and updating the threshold value when the measured angle of the door changes.

24. The method of claim 19, comprising:

continually detecting, by the load sensor, the load applied by the door to the mount, determining whether the detected load continues to exceed the threshold value, and outputting the indication if the load applied by the door continues to exceed the threshold value for at least a specified period.

25. One or more non-transitory computer readable media storing executable instructions which, when executed, is are arranged to perform a method according to claim 19.

* * * * *